(12) United States Patent
Spektor et al.

(10) Patent No.: US 8,456,517 B2
(45) Date of Patent: Jun. 4, 2013

(54) INTEGRATED PROCESSOR FOR 3D MAPPING

(75) Inventors: Evgeny Spektor, Petach Tikva (IL); Zafrir Mor, Ein Habsor (IL); Dmitri Rais, Ramat Gan (IL)

(73) Assignee: Primesense Ltd., Tel Aviv (IL)

( * ) Notice: Subject to any disclaimer, the term of this patent is extended or adjusted under 35 U.S.C. 154(b) by 1021 days.

(21) Appl. No.: 12/397,362

(22) Filed: Mar. 4, 2009

(65) Prior Publication Data
US 2010/0007717 A1    Jan. 14, 2010

Related U.S. Application Data

(60) Provisional application No. 61/079,254, filed on Jul. 9, 2008.

(51) Int. Cl.
*H04N 15/00* (2006.01)
*G06K 9/32* (2006.01)

(52) U.S. Cl.
USPC ......... 348/43; 348/E13.001; 348/46; 382/298

(58) Field of Classification Search
None
See application file for complete search history.

(56) References Cited

U.S. PATENT DOCUMENTS

| | | |
|---|---|---|
| 4,336,978 A | 6/1982 | Suzuki |
| 4,542,376 A | 9/1985 | Bass et al. |
| 4,802,759 A | 2/1989 | Matsumoto |
| 4,843,568 A | 6/1989 | Krueger et al. |
| 5,075,562 A | 12/1991 | Greivenkamp, Jr. et al. |
| 5,483,261 A | 1/1996 | Yasutake |
| 5,630,043 A | 5/1997 | Uhlin |
| 5,636,025 A | 6/1997 | Bieman |
| 5,835,218 A | 11/1998 | Harding |
| 5,838,428 A | 11/1998 | Pipitone et al. |
| 5,856,871 A | 1/1999 | Cabib et al. |
| 5,909,312 A | 6/1999 | Mendlovic et al. |
| 6,041,140 A | 3/2000 | Binns et al. |
| 6,081,269 A | 6/2000 | Quarendon |
| 6,084,712 A | 7/2000 | Harding |
| 6,088,105 A | 7/2000 | Link |
| 6,099,134 A | 8/2000 | Taniguchi et al. |
| 6,100,517 A | 8/2000 | Yahav et al. |
| 6,101,269 A | 8/2000 | Hunter et al. |

(Continued)

FOREIGN PATENT DOCUMENTS

| | | |
|---|---|---|
| DE | 19736169 A1 | 8/1997 |
| DE | 19638727 A1 | 3/1998 |

(Continued)

OTHER PUBLICATIONS

Theocaris et al., "Radial Gratings as Moire Gauges", Journal of Scientific Instruments (Journal of Physics E), series 2, vol. 1, year 1968.

(Continued)

*Primary Examiner* — Wen-Tai Lin
(74) *Attorney, Agent, or Firm* — D. Kligler I.P. Services Ltd.

(57) ABSTRACT

A device for processing data includes a first input port for receiving color image data from a first image sensor and a second input port for receiving depth-related image data from a second image sensor. Processing circuitry generates a depth map using the depth-related image data. At least one output port conveys the depth map and the color image data to a host computer.

28 Claims, 9 Drawing Sheets

U.S. PATENT DOCUMENTS

| | | | |
|---|---|---|---|
| 6,108,036 A | 8/2000 | Harada et al. | |
| 6,167,151 A | 12/2000 | Albeck et al. | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,438,263 B2 | 8/2002 | Albeck et al. | |
| 6,494,837 B2 | 12/2002 | Kim et al. | |
| 6,495,848 B1 | 12/2002 | Rubbert | |
| 6,686,921 B1 | 2/2004 | Rushmeier et al. | |
| 6,700,669 B1 | 3/2004 | Geng | |
| 6,731,391 B1 | 5/2004 | Kao et al. | |
| 6,741,251 B2 | 5/2004 | Malzbender | |
| 6,751,344 B1 | 6/2004 | Grumbine | |
| 6,754,370 B1 | 6/2004 | Hall-Holt et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,937,348 B2 | 8/2005 | Geng | |
| 7,006,952 B1 | 2/2006 | Matsumoto et al. | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 | 3/2007 | Hersch et al. | |
| 7,256,899 B1 | 8/2007 | Faul et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,560,679 B1 | 7/2009 | Gutierrez | |
| 7,659,995 B2 | 2/2010 | Knighton et al. | |
| 7,700,904 B2 | 4/2010 | Toyoda et al. | |
| 7,751,063 B2 | 7/2010 | Dillon et al. | |
| 7,840,031 B2 | 11/2010 | Albertson et al. | |
| 8,126,261 B2 | 2/2012 | Medioni et al. | |
| 8,326,025 B2 | 12/2012 | Boughorbel | |
| 2001/0016063 A1 | 8/2001 | Albeck et al. | |
| 2002/0041327 A1 | 4/2002 | Hildreth et al. | |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2005/0018209 A1 | 1/2005 | Lemelin et al. | |
| 2005/0052637 A1 | 3/2005 | Shaw et al. | |
| 2005/0200838 A1 | 9/2005 | Shaw et al. | |
| 2005/0200925 A1 | 9/2005 | Brotherton-Ratcliffe et al. | |
| 2005/0231465 A1 | 10/2005 | DePue et al. | |
| 2005/0271279 A1 | 12/2005 | Fujimura et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2006/0221250 A1 | 10/2006 | Rossbach et al. | |
| 2007/0057946 A1 | 3/2007 | Albeck et al. | |
| 2007/0060336 A1 | 3/2007 | Marks et al. | |
| 2007/0133840 A1 | 6/2007 | Cilia | |
| 2007/0165243 A1 | 7/2007 | Kang et al. | |
| 2008/0018595 A1 | 1/2008 | Hildreth et al. | |
| 2008/0031513 A1 | 2/2008 | Hart | |
| 2008/0106746 A1* | 5/2008 | Shpunt et al. | 356/610 |
| 2008/0118143 A1 | 5/2008 | Gordon et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1* | 10/2008 | Tam et al. | 382/298 |
| 2009/0016642 A1 | 1/2009 | Hart | |
| 2009/0060307 A1 | 3/2009 | Ghanem et al. | |
| 2009/0096783 A1 | 4/2009 | Shpunt | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2009/0226079 A1 | 9/2009 | Katz et al. | |
| 2009/0244309 A1 | 10/2009 | Maison et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0128221 A1 | 5/2010 | Muller et al. | |
| 2010/0177164 A1 | 7/2010 | Zalevsky | |
| 2010/0182406 A1* | 7/2010 | Benitez | 348/46 |
| 2010/0194745 A1 | 8/2010 | Leister et al. | |
| 2010/0201811 A1 | 8/2010 | Garcia et al. | |
| 2010/0225746 A1 | 9/2010 | Shpunt et al. | |
| 2010/0265316 A1 | 10/2010 | Sali et al. | |
| 2010/0278384 A1 | 11/2010 | Shotton et al. | |
| 2010/0290698 A1 | 11/2010 | Shpunt et al. | |
| 2010/0303289 A1 | 12/2010 | Polzin et al. | |
| 2011/0001799 A1 | 1/2011 | Rothenberger et al. | |
| 2011/0025827 A1 | 2/2011 | Shpunt et al. | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0211044 A1 | 9/2011 | Shpunt et al. | |
| 2011/0285910 A1 | 11/2011 | Bamji et al. | |
| 2012/0051588 A1 | 3/2012 | McEldowney | |

FOREIGN PATENT DOCUMENTS

| | | |
|---|---|---|
| EP | 1321894 A2 | 6/2003 |
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007043036 A1 | 4/2007 |
| WO | 2007096893 A2 | 8/2007 |
| WO | 2007105205 A2 | 9/2007 |
| WO | 2007105215 A2 | 9/2007 |
| WO | 2008120217 A2 | 10/2008 |

OTHER PUBLICATIONS

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Ypsilos et al., "Speech-Driven Face Synthesis from 3D Video", 2nd International Symposium on 3D Processing, Visualization and Transmission, Thessaloniki, Greece, Sep. 6-9, 2004.

Ypsilos et al., "Video-Rate Capture of Dynamic Face Shape and Appearance", Sixth IEEE International Conference on Automatic Face and Gesture Recognition (FGR 2004), Seoul, Korea, May 17-19, 2004.

Zhang et al., "Height Recovery from Intensity Gradients", Proceedings of IEEE Computer Society Conference on Computer Vision and Pattern Recognition, pp. 508-513, year 1994.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.

Zhang et al., "Shape from Intensity Gradient", IEEE Transactions on Systems, Man and Cybernetics—Part A: Systems and Humans, vol. 29, No. 3, pp. 318-325, May 1994.

Zigelman et al., "Texture Mapping Using Surface Flattening via Multi-Dimensional Scaling", IEEE Transactions on Visualization and Computer Graphics, vol. 8, issue 2, pp. 198-207, Aug. 7, 2002.

Garcia et al., U.S. Appl. No. 61/151,853 "Depth Ranging with Moire Patterns" filed on Feb. 12, 2009.

Hovanesian et al., "Moire Contour-Sum Contour-Difference, and Vibration Analysis of Arbitrary Objects", Applied Optics Journal, vol. 10, No. 12, pp. 2734-2738, Dec. 1971.

International Application PCT/IL2008/000095 Search Report dated Jul. 24, 2008.

Japanese Patent Application # 2008558981 Official Action dated Nov. 2, 2011.

U.S. Appl. No. 12/522,171 Official Action dated Dec. 22, 2011.

U.S. Appl. No. 12/522,172 Official Action dated Nov. 30, 2011.

Japanese Patent Application # 2008558984 Official Action dated Nov. 1, 2011.

U.S. Appl. No. 13/043,488 Official Action dated Jan. 3, 2012.

Japanese Patent Application # 2008535179 Official Action dated Nov. 8, 2011.

Chinese Patent Application # 2006800038004.2 Official Action dated Nov. 24, 2011.

Marcia et al., "Superimposed Video Disambiguation for Increased Field of View", Optics Express 16:21, pp. 16352-16363, year 2008.

Guan et al., "Composite Structured Light Pattern for Three Dimensional Video", Optics Express 11:5, pp. 406-417, year 2008.

U.S. Appl. No. 13/311,584, filed on Dec. 6, 2011.

PCT Application PCT/IB2011/055155 filed on Nov. 17, 2011.

Lavoie et al., "3-D Object Model Recovery From 2-D Images Using Structured Light", IEEE Transactions on Instrumentation and Measurement, vol. 53, No. 2, pp. 437-443, Apr. 2004.

Chinese Application # 200780016625.5 Office Action dated May 12, 2011.

U.S. Appl. No. 11/899,542 Office Action dated Apr. 4, 2011.

U.S. Appl. No. 11/724,068 Office Action dated Mar. 1, 2011.

Chinese Application # 200780009053.8 Office Action dated Mar. 10, 2011.

Japanese Application # 2008535179 Office Action dated Apr. 1, 2011.

Kun et al., "Gaussian Laser Beam Spatial Distribution Measurement by Speckles Displacement Method", Hich Power Laser and Particle Beams, vol. 12, No. 2, Apr. 2000.

Chinese Patent Application # 200680038004.2 Official Action dated Dec. 24, 2010.

Mor et al., U.S. Appl. No. 12/762,373 "Synchronization of Projected Illumination with Rolling Shutter of Image Sensor" filed on Apr. 19, 2010.

Petronius et al., U.S. Appl. No. 61/300,465 "Integrated Photonics Module for Optical Projection" filed on Feb. 2, 2010.

Sali et al., U.S. Appl. No. 12/758,047 "Three-Dimensional Mapping and Imaging" filed on Apr. 12, 2010.

Garcia et al., U.S. Appl. No. 12/703,794 "Depth Ranging with Moire Patterns" filed on Feb. 11, 2010.

Shpunt et al., U.S. Appl. No. 12/707,678 "Reference Image Techniques for 3D sensing" filed on Feb. 18, 2010.

Luxtera Inc., "Luxtera Announces World's First 10GBit CMOS Photonics Platform", Carlsbad, USA, Mar. 28, 2005 (press release).

Lee et al., "Variable Pulse Mode Driving IR Source Based 3D Robotic Camera", MVA2005 IAPR Conference on Machine Vision Applications, pp. 530-533, Japan, May 16-18, 2005.

Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.

Beraldin et al., "Active 3D Sensing", Scuola Normale Superiore Pisa, vol. 10, pp. 22-46, Apr. 2000.

Bhat et al., "Ordinal Measures for Image Correspondence", IEEE Transactions on Pattern Analysis and Machine Intelligence, vol. 20, No. 4, pp. 415-423, Apr. 1998.

Bradley et al., "Synchronization and Rolling Shutter Compensation for Consumer Video Camera Arrays", IEEE International Workshop on Projector-Camera Systems—Procams 2009 (Miami Beach, Florida, 2009).

De Piero et al., "3D Computer Vision Using Structured Light: Design Calibration and Implementation Issues", Advances in Computers, vol. 43, pp. 243-278, Academic Press 1996.

Hongjun et al., "Shape Measurement by Digital Speckle Temporal Sequence Correlation Method", Acta Optica Sinica Journal, vol. 21, No. 10, pp. 1208-1213, Oct. 2001.

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.

Hsueh et al., "Real-time 3D Topography by Speckle Image Correlation", Proceedings of SPIE Conference on Input/Output and Imaging Technologies, vol. 3422, pp. 108-112, Taiwan, Jul. 1998.

Chinese Patent Application # 200780009053.8 Official Action dated Apr. 15, 2010 (with English translation).

Chinese Patent Application # 200680038004.2 Official Action dated Mar. 30, 2010 (with English translation).

Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.

EZconn Czech A.S., "Site Presentation", Oct. 2009.

Zhang et al., "Shape from intensity gradient", IEEE Transactions on Systems, Man and Cybernetics—Part A: Systems and Humans, vol. 29, No. 3, pp. 318-325, May 1999.

International Application PCT/IL2009/000285 Search Report dated Jun. 11, 2009.

Magal et al., U.S. Appl. No. 12/352,622 "Three-dimensional user interface" filed on Jan. 13, 2009.

Spektor et al., U.S. Appl. No. 61/162,309 "Integrated Chip with experience understanding" filed on Mar. 22, 2009.

Engfield, N., "Use of Pseudorandom Encoded Grid in U.S. Appl. No. 11/899,542", Andrews Robichaud, Jun. 22, 2011.

U.S. Appl. No. 61/471,215, filed Apr. 4, 2011.

Chinese Patent Application # 200680038004.2 Official Action dated Aug. 3, 2011 (English translation).

International Application PCT/IB2011/053560 filed on Aug. 10, 2011.

U.S. Appl. No. 61/419,891, filed Dec. 06, 2010.

U.S. Appl. No. 61/415,352, filed Nov. 19, 2010.

Abramson, N., "Holographic Contouring by Translation", Applied Optics Journal, vol. 15, No. 4, pp. 1018-1976, Apr. 1976.

Achan et al., "Phase Unwrapping by Minimizing Kikuchi Free Energy", IEEE International Geoscience and Remote Sensing Symposium, pp. 1738-1740, Toronto, Canada, Jun. 2002.

Asada et al., "Determining Surface Orientation by Projecting a Stripe Pattern", IEEE Transactions on Pattern Analysis and Machine Intelligence, vol. 10, No. 5, year 1988.

Avidan et al., "Trajectory Triangulation: 3D Reconstruction of Moving Points from Amonocular Image Sequence", IEEE Transactions on Pattern Analysis and Machine Intelligence, vol. 22, No. 4, pages, Apr. 2000.

Besl, P., "Active Optical Range Imaging Sensors", Machine Vision and Applications, No. 1, pp. 127-152, USA 1988.

Brooks et al., "Moire Gauging Using Optical Interference Patterns", Applied Optics Journal, vol. 8, No. 5, pp. 935-940, May 1969.

Bruckstein, A., "On Shape from Shading", Computer Vision, Graphics, and Image Processing, vol. 44, pp. 139-154, year 1988.

Bryngdahl, O., "Characteristics of Superposed Patterns in Optics", Journal of Optical Society of America, vol. 66, No. 2, pp. 87-94, Feb. 1976.

Chen et al., "Measuring of a Three-Dimensional Surface by Use of a Spatial Distance Computation", Applied Optics Journal, vol. 42, issue 11, pp. 1958-1972, 2003.

Chen et al., "Overview of Three-Dimensional Shape Measurement Using Optical Methods", Society of Photo-Optical Instrumentation Engineers Journal 39(1), pp. 10-22, Jan. 2000.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.
Dainty, J.C., "Introduction", Laser Speckle and Related Phenomena, pp. 1-7, Springer-Verlag, Berlin Heidelberg, 1975.
Doty, J.L., "Projection Moire for Remote Contour Analysis", Journal of Optical Society of America, vol. 73, No. 3, pp. 366-372, Mar. 1983.
Ben Eliezer et al., "Experimental Realization of an Imaging System with an Extended Depth of Field", Applied Optics Journal, vol. 44, No. 14, pp. 2792-2798, May 10, 2005.
Garcia et al., "Three Dimensional Mapping and Range Measurement by Means of Projected Speckle Patterns", Applied Optics Journal, vol. 47, No. 16, pp. 3032-3040, Jun. 1, 2008.
Goodman, J.W., "Statistical Properties of Laser Speckle Patterns", Laser Speckle and Related Phenomena, pp. 9-75, Springer-Verlag, Berlin Heidelberg, 1975.
Hanson et al. "Optics and Fluid Dynamics Department", Annual Progress Report for 1997 (an abstract).
Hart, D., U.S. Appl. No. 09/616,606 "Method and System for High Resolution, Ultra Fast 3-D Imaging" filed on Jul. 14, 2000.
Hildebrand et al., "Multiple-Wavelength and Multiple-Source Holography Applied to Contour Generation", Journal of Optical Society of America Journal, vol. 57, No. 2, pp. 155-162, Feb. 1967.
Horn et al., "Toward Optimal Structured Light Patterns", Proceedings of International Conference on Recent Advances in 3D Digital Imaging and Modeling, pp. 28-37, Ottawa, Canada, May 1997.
Horn, B., "Height and Gradient from Shading", International Journal of Computer Vision, No. 5, pp. 37-76, year 1990.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
International Application PCT/IL2007/000262 Search Report dated Oct. 16, 2008.
International Application PCT/IL2007/000262 Preliminary Report on Patentability dated Mar. 19, 2009.
International Application PCT/IL2007/000306 Search Report dated Oct. 2, 2008.
International Application PCT/IL2007/000306 Preliminary Report on Patentability dated Mar. 19, 2009.
International Application PCT/IL2006/000335 Preliminary Report on Patentability dated Apr. 24, 2008.
International Application PCT/IL2007/000327 Search Report dated Sep. 26, 2008.
International Application PCT/IL2007/000327 Preliminary Report on Patentability dated Mar. 12, 2009.
International Application PCT/IL2008/000458 Search Report dated Oct. 28, 2008.
Takeda et al., "Fourier Transform Methods of Fringe-Pattern Analysis for Computer-Based Topography and Interferometry", Journal of Optical Society of America, vol. 72, No. 1, Jan. 1982.
Kimmel et al., "Analyzing and Synthesizing Images by Evolving Curves with the Osher-Sethian Method", International Journal of Computer Vision, 24(1), pp. 37-56, year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Leclerc et al., "The Direct Computation of Height From Shading", Proceedings of Computer Vision and Pattern Recognition, pp. 552-558, year 1991.
Lim et al., "Additive Type Moire with Computer Image Processing", Applied Optics Journal, vol. 28, No. 13, pp. 2677-2680, Jul. 1, 1989.
Mendlovic, et al., "Composite Harmonic Filters for scale, projection and shift invariant pattern recognition", Applied Optics Journal, vol. 34, No. 2, pp. 310-316, Jan. 10, 1995.
Piestun et al., "Wave Fields in Three Dimensions: Analysis and Synthesis", Journal of the Optical Society of America, vol. 13, No. 9, pp. 1837-1848, Sep. 1996.
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Sazbon et al., "Qualitative Real-Time Range Extraction for Preplanned Scene Partitioning Using Laser Beam Coding", Pattern Recognition Letters 26, pp. 1772-1781, year 2005.
Shpunt et al., U.S. Appl. No. 61/157,560 "Reference Image Techniques for 3D Sensing" filed on Mar. 5, 2009.
Shpunt et al., U.S. Appl. No. 61/229,754 "Pattern-Based Depth Mapping with Stereoscopic Assistance" filed on Jul. 30, 2009.
Sjodahl et al., "Measurement of Shape by Using Projected Random and Patterns and Temporal Digital Speckle Photography", Applied Optics Journal, vol. 38, No. 10, pp. 1990-1997, Apr. 1, 1999.
Tay et al., "Grating Projection System for Surface Contour Measurement", Applied Optics Journal, vol. 44, No. 8, pp. 1393-1400, Mar. 10, 2005.
Su et al., "Application of Modulation Measurement Profilometry to Objects with Surface Holes", Applied Optics Journal, vol. 38, No. 7, pp. 1153-1158, Mar. 1, 1999.
Takasaki, H., "Moire Topography", Applied Optics Journal, vol. 9, No. 6, pp. 1467-1472, Jun. 1970.
Takasaki, H., "Moire Topography", Applied Optics Journal, vol. 12, No. 4, pp. 845-850, Apr. 1973.
International Application PCT/IB2011/055155 Search Report dated Apr. 20, 2012.
U.S. Appl. No. 12/522,171 Official Action dated Apr. 5, 2012.
U.S. Appl. No. 131541,775, filed Jul. 5, 2012.
U.S. Appl. No. 12/282,517 Official Action dated Jun. 12, 2012.
U.S. Appl. No. 12/522,172 Official Action dated Jun. 29, 2012.
U.S. Appl. No. 12/703,794 Official Action dated Aug. 7, 2012.
U.S. Appl. No. 12/522,176 Official Action dated Aug. 2, 2012.
JP Patent Application # 2008558984 Office Action dated Jul. 3, 2012.
Chinese Patent Application # 200980120888.X Official Action dated Sep. 13, 2012.
Japanese Patent Application # 2011-517308 Official Action dated Dec. 5, 2012.
U.S. Appl. No. 12/844,864 Official Action dated Dec. 6, 2012.
U.S. Appl. No. 12/758,047 Official Action dated Oct. 25, 2012.
U.S. Appl. No. 13/036,023 Official Action dated Jan. 7, 2013.
Korean Patent Application # 10-2008-7025030 Office Action dated Feb. 25, 2013.
U.S. Appl. No. 12/707,678, Office Action dated Feb. 26, 2013.
U.S. Appl. No. 12/758,047, Office Action dated Apr. 25, 2013.
U.S. Appl. No. 12/844,864, Office Action dated Apr. 11, 2013.

* cited by examiner

INTEGRATED PROCESSOR FOR 3D MAPPING

CROSS-REFERENCE TO RELATED APPLICATION

This application claims the benefit of U.S. Provisional Patent Application 61/079,254, filed Jul. 9, 2008, which is incorporated herein by reference.

FIELD OF THE INVENTION

The present invention relates generally to methods and systems for three-dimensional (3D) mapping, and specifically to processing devices for generation and processing of 3D mapping data.

BACKGROUND OF THE INVENTION

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

As a further example, PCT International Publication WO 93/03579 describes a 3D vision system in which one or two projectors establish structured light comprising two sets of parallel stripes having different periodicities and angles. As another example, U.S. Pat. No. 6,751,344 describes a method for optically scanning a subject in which the subject is illuminated with a matrix of discrete two-dimensional image objects, such as a grid of dots. Other methods involve projection of a grating pattern, as described, for example, in U.S. Pat. No. 4,802,759. The disclosures of the above-mentioned patents and publications are incorporated herein by reference.

SUMMARY OF THE INVENTION

Embodiments of the present invention that are described hereinbelow provide devices and methods for processing of image data for 3D mapping.

In accordance with an embodiment of the present invention, a device for processing data includes a first input port for receiving color image data from a first image sensor and a second input port for receiving depth-related image data from a second image sensor. Processing circuitry generates a depth map using the depth-related image data, and at least one output port conveys the depth map and the color image data to a host computer.

In a disclosed embodiment, the first and second input ports, the processing circuitry and the at least one output port are integrated circuit components, which are fabricated on a single semiconductor substrate.

In some embodiments, the at least one output port includes a single port and is coupled to convey the depth map and the color image data to the host computer as a single data stream in a multiplexed format. Typically, the processing circuitry is configured to synchronize the depth map with the color image data in the single data stream. Optionally, the device includes a third input port for receiving audio information, wherein the processing circuitry is configured to incorporate the audio information together with the depth map and the color image data into the single data stream for conveyance to the host computer via the single port. In one embodiment, the single port includes a Universal Serial Bus (USB) port.

In disclosed embodiments, the processing circuitry is configured to register the depth map with the color image data. The depth map includes an array of pixels with respective depth values, and the processing circuitry is typically configured to compute respective shifts for the pixels responsively to the depth values, and to apply the respective shifts to the pixels in the depth map in order to register the depth map with the color image data. In one embodiment, the processing circuitry is configured to compute the respective shifts incrementally, using an incremental fitting process, such that the shifts of the pixels within a line of the depth map are computed as a function of a preceding pixel shift. Typically, the processing circuitry is configured to compute the respective shifts for the pixels on the fly, while receiving the depth values, without storing the entire depth map in the device.

In some embodiments, the processing circuitry is configured to compress the depth map and the color image data for transmission to the host via the at least one output port. In one embodiment, the processing circuitry is configured to apply a process of lossless compression to the depth map and the color image data.

In a disclosed embodiment, the depth-related image data include an image of a pattern that is projected onto an object, and the processing circuitry is configured to generate the depth map by measuring shifts in the pattern relative to a reference image.

There is also provided, in accordance with an embodiment of the present invention, apparatus for imaging, including a first image sensor, which is configured to capture and output a color image of an object, and a second image sensor, which is configured to capture and output depth-related image data with respect to the object. A processing device includes a first input port for receiving the color image data from the first image sensor and a second input port for receiving the depth-related image data from the second image sensor, as well as processing circuitry, for generating a depth map using the depth-related image data, and at least one output port for conveying the depth map and the color image data to a host computer.

Optionally, the apparatus includes an audio sensor, wherein the processing device includes a third input port for receiving audio information from the audio sensor, and wherein the processing circuitry is configured to convey the audio information together with the depth map and the color image data to the host computer via the at least one output port.

In a disclosed embodiment, the apparatus includes an illumination subassembly, which is configured to project a pattern onto the object, wherein the depth-related image data include an image of the pattern on the object, and the processing circuitry is configured to generate the depth map by measuring shifts in the pattern relative to a reference image.

There is additionally provided, in accordance with an embodiment of the present invention, a method for processing data, including receiving color image data from a first image sensor via a first input port and receiving depth-related image data from a second image sensor via a second input port. A depth map is generated using the depth-related image data, and the depth map and the color image data are conveyed via an output port to a host computer.

The present invention will be more fully understood from the following detailed description of the embodiments thereof, taken together with the drawings in which:

DETAILED DESCRIPTION OF EMBODIMENTS

System Overview

Figure 1:
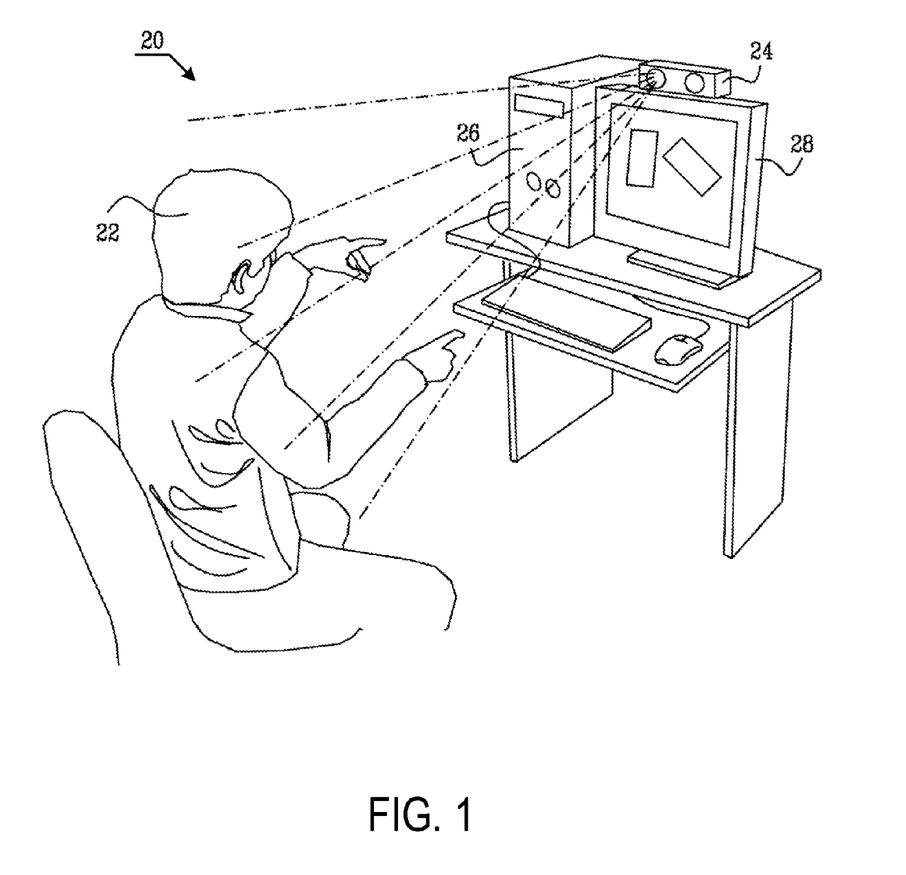
FIG. 1 is a schematic, pictorial illustration of a system for 3D mapping, in accordance with an embodiment of the present invention.

FIG. 1 is a schematic, pictorial illustration of a system 20 for 3D mapping and imaging, in accordance with an embodiment of the present invention. In this example, an imaging assembly 24 is configured to capture and process 3D maps and images of a user 22. This information may be used by a host computer 26 as part of a 3D user interface, which enables the user to interact with games and other applications running on the computer. (This sort of functionality is described, for example, in U.S. patent application Ser. No. 12/352,622, filed Jan. 13, 2009, whose disclosure is incorporated herein by reference.) This particular application of system 20 is shown here only by way of example, however, and the mapping and imaging capabilities of system 20 may be used for other purposes, as well, and applied to substantially any suitable type of 3D object.

In the example shown in FIG. 1, imaging assembly 24 projects a pattern of optical radiation onto the body (or at least parts of the body) of user 22, and captures an image of the pattern that appears on the body surface. The optical radiation that is used for this purpose is typically in the infrared (IR) range. A processing device in assembly 24, which is described in detail hereinbelow, processes the image of the pattern in order to generate a depth map of the body, i.e., an array of 3D coordinates, comprising a depth (Z) coordinate value of the body surface at each point (X, Y) within a predefined area. (In the context of an array of image-related data, these (X, Y) points are also referred to as pixels.) In the embodiments that are described hereinbelow, the processing device computes the 3D coordinates of points on the surface of the user's body by triangulation, based on transverse shifts of the spots in the pattern, as described in the above-mentioned PCT publications WO 2007/043036, WO 2007/105205 and WO 2008/120217. Alternatively, system 20 may implement other methods of 3D mapping, using single or multiple cameras or other types of sensors, as are known in the art.

In addition, imaging assembly 24 captures color (2D) images of the user and may also receive audio input. The imaging assembly registers and synchronizes the depth maps with the color images, and generates a data stream that includes the depth maps and image data (and possibly the audio data, as well) for output to computer 26. In some embodiments, as described hereinbelow, the depth maps, color images, and possibly the audio data are integrated into a single data stream, which is output to the computer via a single port, for example, a Universal Serial Bus (USB) port.

Computer 26 processes the data generated by assembly 24 in order to extract 3D image information. For example, the computer may segment the depth map in order to identify the parts of the body of user 22 and find their 3D locations. Computer 26 may use this information in driving an output device, such as a display 28, typically to present 3D image information and/or user interface elements that may be controlled by movements of parts of the user's body. Generally, computer 26 comprises a general-purpose computer processor, which is programmed in software to carry out these functions. The software may be downloaded to the processor in electronic form, over a network, for example, or it may alternatively be provided on tangible media, such as optical, magnetic, or electronic memory media.

As another alternative, the processing functions that are associated here with computer 26 may be carried out by a suitable processor that is integrated with display 28 (in a television set, for example) or with any other suitable sort of computerized device, such as a game console or media player.

Figure 2:
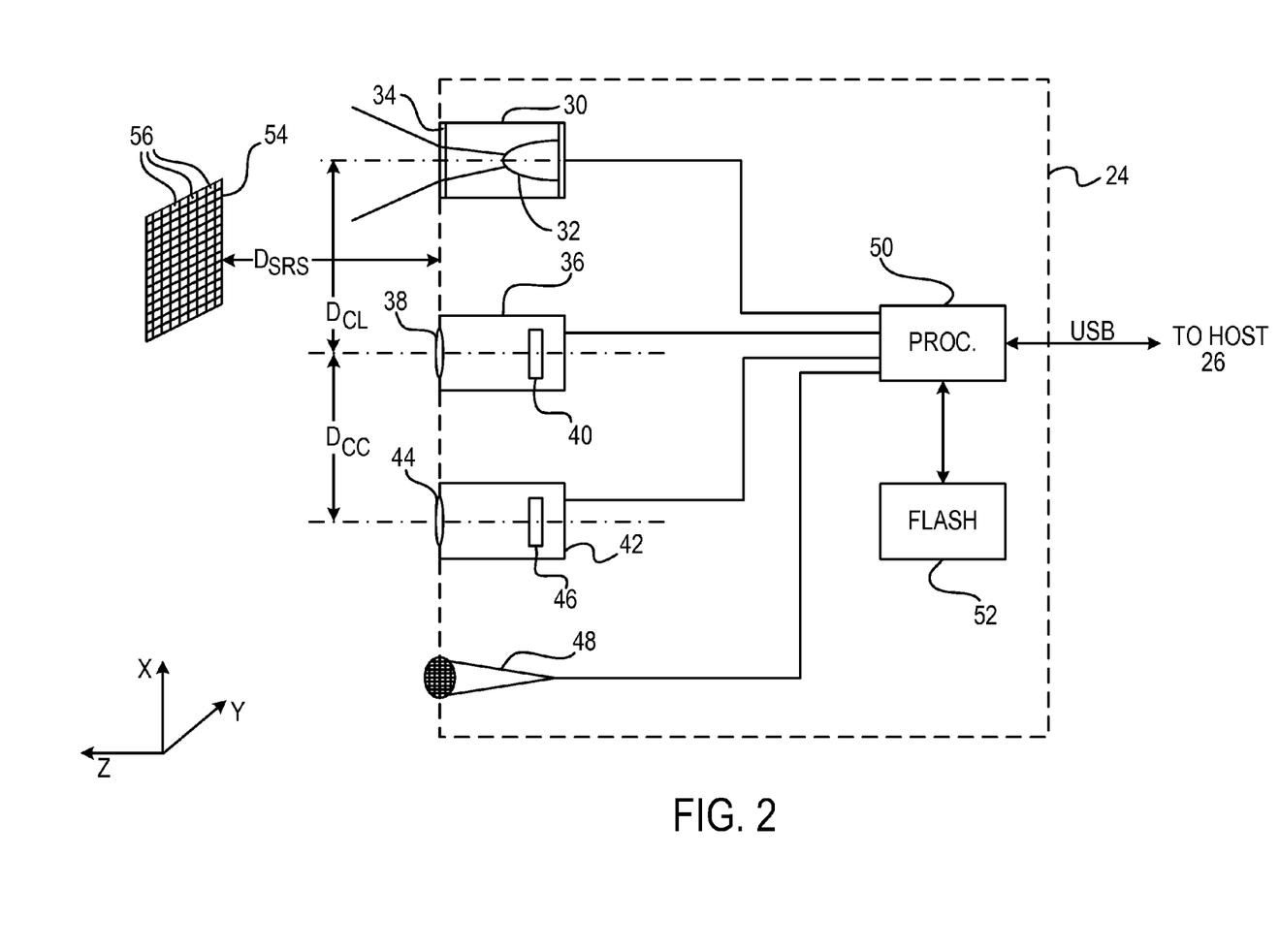
FIG. 2 is a schematic top view of an imaging assembly, in accordance with an embodiment of the present invention.

FIG. 2 is a schematic top view of imaging assembly 24, in accordance with an embodiment of the present invention. Here the X-axis is taken to be the horizontal direction along the front of assembly 24, the Y-axis is the vertical direction (into the page in this view), and the Z-axis extends away from assembly 24 in the general direction of the object being imaged by the assembly.

For 3D mapping, an illumination subassembly 30 illuminates the object with an appropriate pattern, such as a speckle pattern. For this purpose, subassembly 30 typically comprises a suitable radiation source 32, such as a diode laser, LED or other light source, and optics, such as a diffuser 34 or a diffractive optical element, for creating the pattern, as described in the above-mentioned PCT publications. A depth image capture subassembly 36 captures an image of the pattern on the object surface. Subassembly 36 typically comprises objective optics 38, which image the object surface onto a detector 40, such as a CMOS image sensor.

As noted above, radiation source 32 typically emits IR radiation, although other radiation bands, in the visible or ultraviolet range, for example, may also be used. Detector 40 may comprise a monochrome image sensor, without an IR-cutoff filter, in order to detect the image of the projected pattern with high sensitivity. To enhance the contrast of the image captured by detector 40, optics 38 or the detector itself may comprise a bandpass filter, which passes the wavelength of radiation source 32 while blocking ambient radiation in other bands.

A color image capture subassembly 42 captures color images of the object. Subassembly 42 typically comprises objective optics 44, which image the object surface onto a detector 46, such as a CMOS color mosaic image sensor. Optics 44 or detector 46 may comprise a filter, such as an IR-cutoff filter, so that the pattern projected by illumination subassembly 30 does not appear in the color images captured by detector 46.

Optionally, a microphone 48 captures audio input, such as voice commands uttered by user 22.

A processing device 50 receives and processes image and audio inputs from subassemblies 36 and 42 and from microphone 48. Details of these processing functions are presented hereinbelow with reference to the figures that follow. Briefly put, processing device 50 compares the image provided by subassembly 36 to a reference image of the pattern projected by subassembly 30 onto a plane 54, at a known distance $D_{srs}$ from assembly 24. (The reference image may be captured as part of a calibration procedure and stored in a memory 52, such as a flash memory, for example.) The processing device matches the local patterns in the captured image to those in the reference image and thus finds the transverse shift for each pixel 56, or group of pixels, within plane 54. Based on these transverse shifts and on the known distance $D_{cc}$ between the optical axes of subassemblies 30 and 36, the processing device computes a depth (Z) coordinate for each pixel.

Processing device 50 synchronizes and registers the depth coordinates in each such 3D map with appropriate pixels in the color images captured by subassembly 42. The registration typically involves a shift of the coordinates associated with each depth value in the 3D map. The shift includes a static component, based on the known distance $D_{cc}$ between the optical axes of subassemblies 36 and 42 and any misalignment between the detectors, as well as a dynamic component that is dependent on the depth coordinates themselves. The registration process is describes in detail hereinbelow.

After registering the depth maps and color images, processing device 50 outputs the depth and color data via a port, such as a USB port, to host computer 26. The output data may be compressed, as described hereinbelow, in order to conserve bandwidth. As noted above, the audio information provided by microphone 28 may also be synchronized and output together with the depth and color data to computer 26.

Processing Device Architecture

Figures 3, 3A:
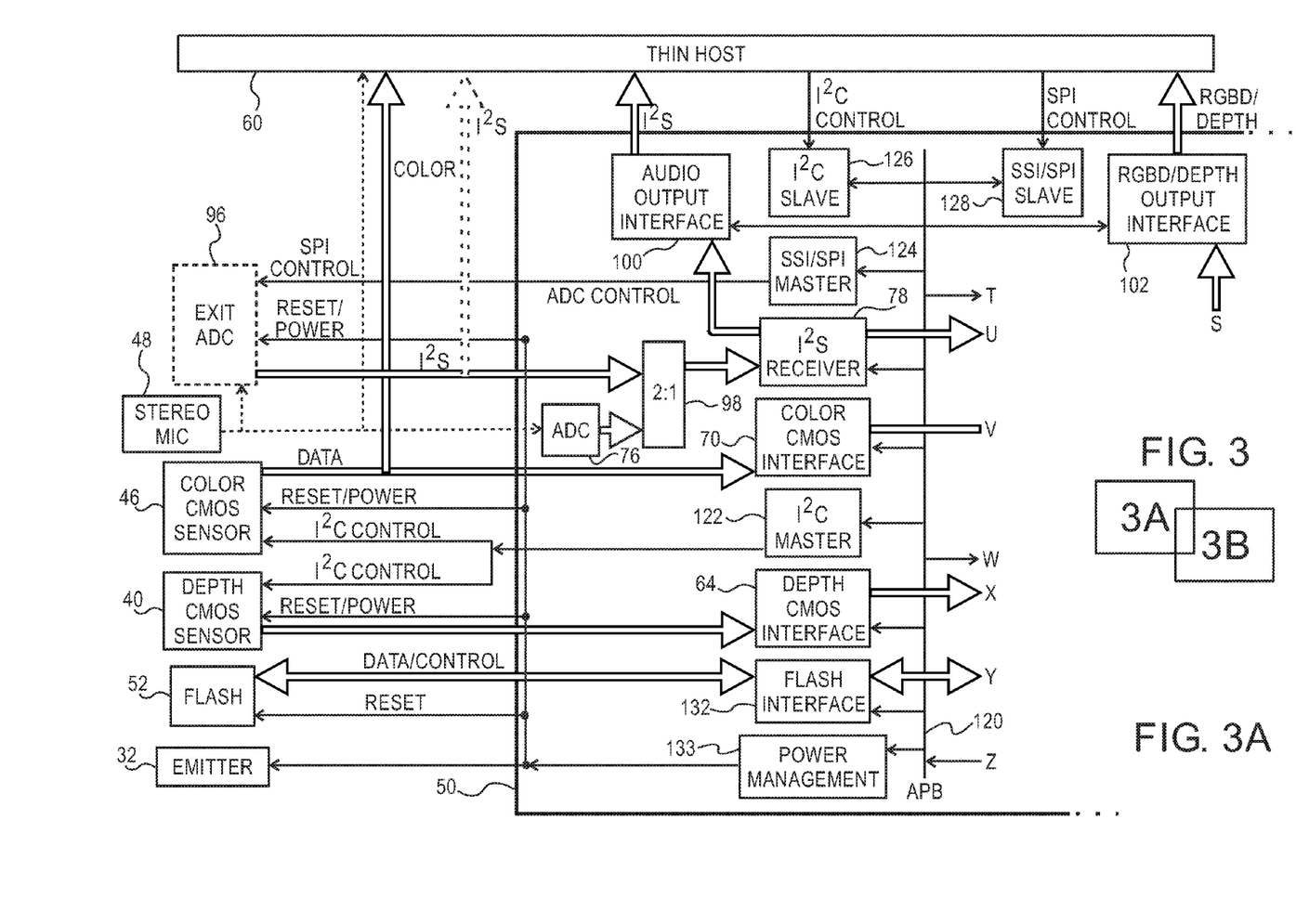
FIGS. 3A and 3B are block diagrams of a processing device, in accordance with an embodiment of the present invention.

FIG. 3 (consisting of FIGS. 3A and 3B) is a block diagram that schematically shows functional elements of processing device 50, in accordance with an embodiment of the present invention. Device 50 may be fabricated as a dedicated integrated circuit, on a single semiconductor substrate, with interfaces to the other components of assembly 24 and a USB port to computer 26 as described above. This sort of implementation is useful in minimizing the cost, size and power consumption of assembly 24. Alternatively, device 50 may be implemented using a number of separate circuit components. Device 50 may include other interfaces, as well, including data and control interfaces to a "thin" host 60, such as a special-purpose multimedia application processor.

Figure 3B:
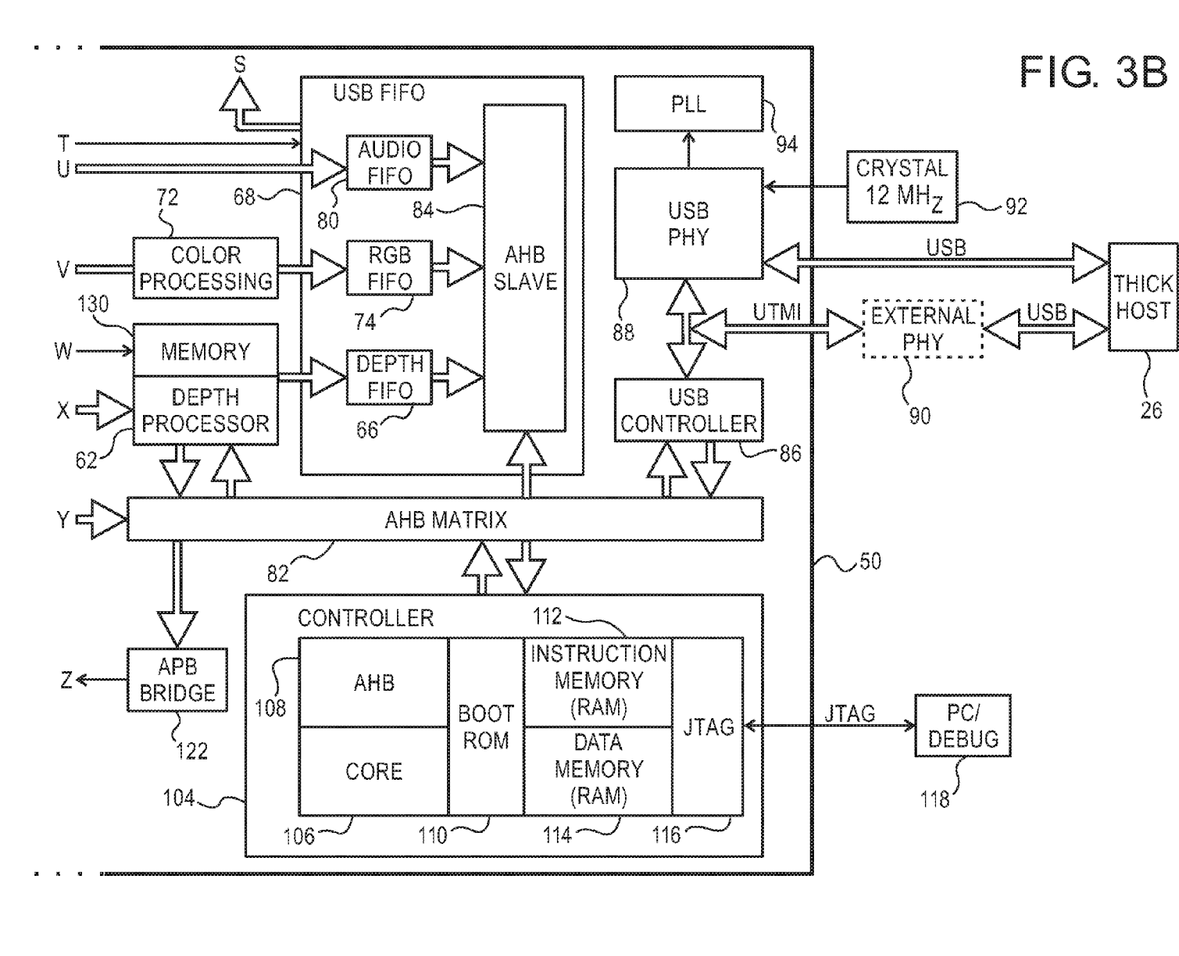

The components of device 50 are described hereinbelow in detail as an example of a possible implementation of the principles of the present invention. Further details of this implementation are presented in the above-mentioned provisional patent application. Alternative implementations will be apparent to those skilled in the art on the basis of the present description and are considered to be within the scope of the present invention. For instance, although the embodiment described hereinbelow uses dedicated hardware processing components, some or all of the processing functions in question may be performed in software by a general-purpose programmable processor with suitable interfaces. The software for this purpose may be downloaded to the processor in electronic form, over a network, for example. Alternatively or additionally, the software may be stored on tangible computer-readable media, such as optical, magnetic, or electronic memory.

In the present example, device 50 comprises the following components:

A depth processor 62 processes the information captured by depth image capture subassembly 36 in order to generate a depth map. Processor 62 uses dedicated memory space in a memory 130. This memory can also be accessed by a controller 104, which is described hereinbelow, but typically not by host computer 26. Rather, processor 62 may be programmed by the host computer via an application program interface (API).

Depth processor 62 receives input video data from detector 40 via a depth CMOS sensor interface 64. The depth processor processes the video data in order to generate successive depth maps, i.e., frames of depth data, as is described in detail hereinbelow with reference to the figures that follow. The depth processor loads these data into a depth first-in-first-out (FIFO) memory 66 in a USB FIFO unit 68.

In parallel with the depth input and processing, a color processing block 72 receives input color video data from detector 46 via a color CMOS sensor interface 70. Block 72 converts the raw input data into output frames of RGB video data, and loads these data into a RGB FIFO memory 74 in unit 68. Alternatively, block 72 may output the video data in other formats, such as YUV or Bayer mosaic format.

In addition, audio signals from microphone 48 are digitized by an analog/digital converter (ADC) 76. The resulting digital audio samples are then conveyed by an audio interface 78 to an audio FIFO memory 80 in unit 68. In the example shown in FIG. 3A, interface 78 comprises an Integrated Interchip Sound (I2S) bus receiver.

USB FIFO unit 68 acts as a buffer level between the various data suppliers and a USB controller 86. Unit 68 packs and formats the various data types according to different classes (such as a USB video class and a USB audio class), and also serves to prevent data loss due to USB bandwidth glitches. It arranges the data into USB packets according to the USB protocol and format prior to transferring them to the USB controller.

A high-bandwidth bus, such as an Advanced High-performance Bus (AHB) matrix 82, is used to carry data between the components of device 50, and specifically for conveying data from USB FIFO unit 68 to USB controller 86 for transfer to host computer 26. (AHB is a bus protocol promulgated by ARM Ltd., of Cambridge, England.) When there are packets ready in FIFO unit 68 and space available in the internal memory of USB controller 86, the USB controller uses direct memory access (DMA) to read data from FIFO memories 66, 74 and 80 via an AHB slave module 84 and AHB matrix 82.

The USB controller multiplexes the color, depth and audio data into a single data stream for output via USB interface to host computer 26.

For the purpose of USB communications, device 50 comprises a USB physical layer interface (PHY) 88, which may be operated by USB controller 86 to communicate via a suitable USB cable with a USB port of host computer 26. The timing of USB PHY 88 is controlled by a crystal oscillator 92 and a phase-locked loop (PLL) 94, as is known in the art. Alternatively, USB controller 86 may optionally communicate with the host computer via a USB 2.0 Transceiver Macrocell Interface (UTMI) and an external PHY 90.

By the same token, an external ADC 96 may optionally be used to digitize the audio signals generated by microphone 48. A 2:1 switch 98 selects the source of digital audio data to be input to I2S receiver 78.

The I2S receiver may also output audio data directly to thin host 60 via an audio output interface 100, in case the thin host is not configured (in distinction to host computer 26) to receive the audio data together with the color and depth image data via a single serial bus. In this case, the RGB and depth (RGBD) data are output to the thin host via a separate RGBD interface 102. Alternatively, for some applications, interface 102 may output only the depth data to thin host 60.

Controller 104 is responsible for managing the functions of device 50, including boot-up and self-test, configuration, power and interface management, and parameter adjustment. The controller comprises a digital signal processor (DSP) core 106 and an AHB master 108 for controlling data movement on AHB matrix 82. Typically, controller 104 boots from a boot read-only memory (ROM) 110, and then loads program code from flash memory 52 via a flash interface 132 into an instruction random-access memory (RAM) 112. The controller also has its own data memory 114. Controller 104 may, in addition, have a test interface 116, such as a Joint Test Action Group (JTAG) interface, for purposes of debugging by an external computer 118.

Controller 104 distributes configuration data and parameters to other components of device 50 via a register configuration interface, such as an Advanced Peripheral Bus (APB) 120, to which the controller is connected through AHB matrix 82 and an APB bridge 122. Various control interfaces are available for controlling these other components, including a Serial Synchronous Interface (SSI) and Serial Peripheral Interface (SPI) master unit 124 and slave unit 128, as well as an Inter-Integrated Circuit (I2C) master unit 122 and slave unit 126. A power management interface 133 provides power and reset signals to the peripheral devices. These particular interfaces are shown here by way of example, and other interface configurations may alternatively be used for similar purposes.

Figure 4:
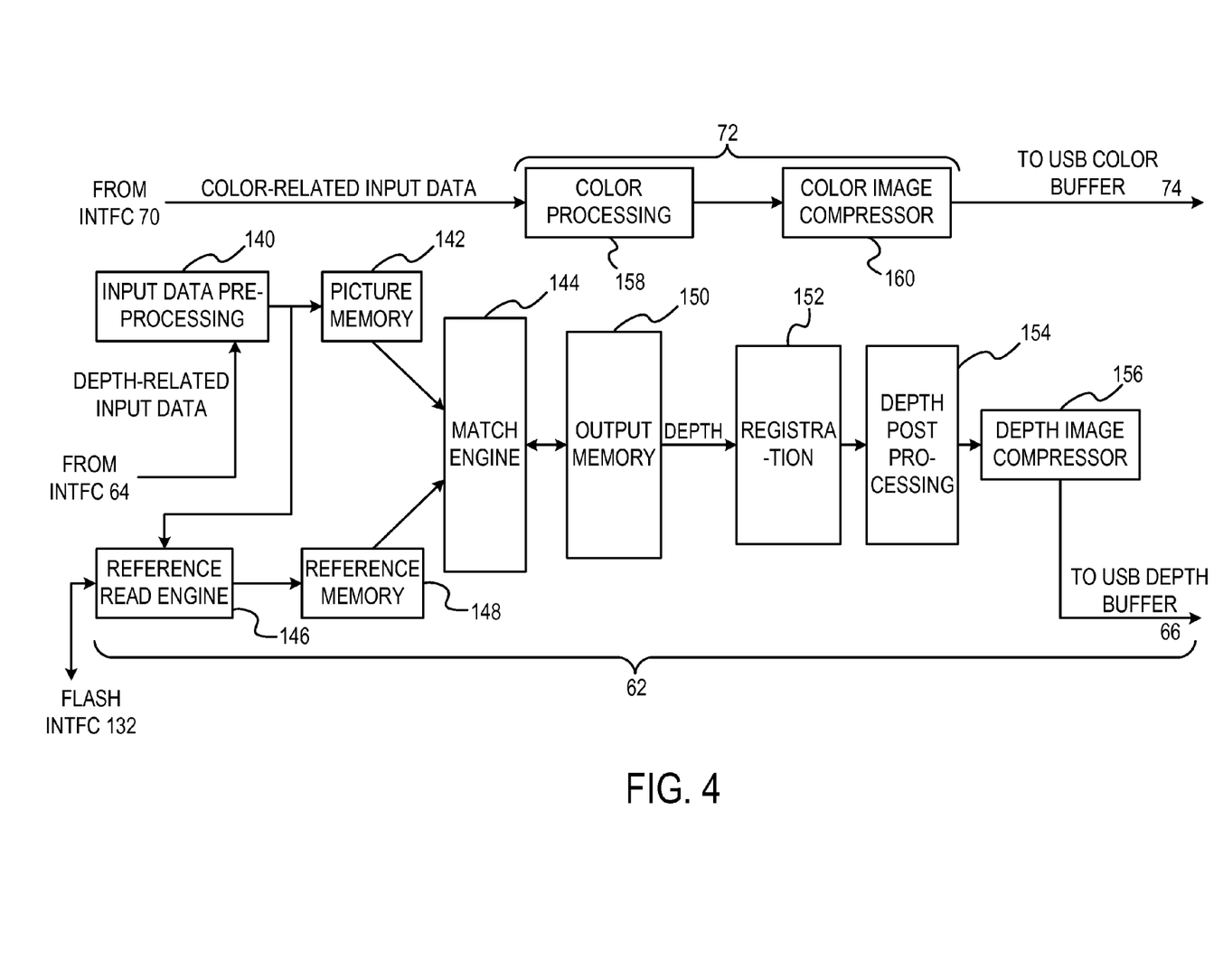
FIG. 4 is a block diagram that schematically shows elements of a depth processor, in accordance with an embodiment of the present invention.

FIG. 4 is a block diagram that schematically shows details of depth processor 62, in accordance with an embodiment of the present invention. The figure also shows certain functions of the parallel color processing block 72.

To reduce on-chip storage and memory requirements, processor 62 typically uses a sliding window approach, in which only part of each processed image is stored in device 50 at any given time, and not the entire image. The window typically contains only a small number of lines of pixels, as required by the algorithms described hereinbelow. Newly-arrived data continually replaces old, processed data in the processor memory. The depth values are reconstructed by processor 62 on the fly, based on the input image data, and are output on the fly via FIFO buffer 66 to host computer 26.

An input data preprocessing block 140 in processor 62 accepts depth-related pixel values from detector 40 via interface 64 and performs filtering operations to reduce noise and possibly to classify the pixels into different groups. The preprocessed data within the current processing window are stored in a picture memory 142. The picture memory may comprise a number of memories or banks to allow simultaneous read of multiple data blocks.

For purposes of depth computation, a reference read engine 146 reads the reference image from memory 52 via interface 132 into a reference memory 148. The reference data are read from memory 52 synchronously with the arrival of the corresponding parts of the current image into memory 142 from preprocessing block 140. Like the picture memory, the reference memory stores only the part of the reference image that falls within the current processing window for the purpose of depth reconstruction, and may comprise a number of memories or banks. Reference read engine 146 may also be controlled to store the reference image initially in memory 52 during the calibration procedure.

A match engine 144 matches groups of input pixels from memory 142 with corresponding groups of reference pixels from memory 148 in order to find the relative offset of the input pixels. The match engine translates this offset into a depth value, as explained above, and writes the depth value to an output memory 150. Again, at any given time, the output memory stores only a small sliding window out of the overall depth map, and may comprise a number of memories or banks.

A registration engine 152 registers the depth values generated by match engine 144 with color image data obtained from detector 46. This registration process is described in detail hereinbelow. Registration engine 152 shifts the locations of the depth values in the depth map to coincide with the appropriate color pixels in the color image. Alternatively, it would be possible to shift the color pixel values to coincide with the corresponding depth map pixels. Following registration, a depth post-processing block 154 applies filtering and possibly other mathematical operations to the depth data.

A compression block 156 compresses the depth data prior to passing the data to USB FIFO unit 68, in order to reduce the required bandwidth on the USB output link. Details of the compression function are described hereinbelow with reference to FIG. 7.

In parallel with the depth processing operations described above, a color image processor 158 in color processing block 72 converts input pixel values received from interface 70 into image data in accordance with an appropriate video standard, such as RGB or YUV, for example. A compression block 160, of similar design to block 156, compresses the color image data, as well.

Registration of Depth with Color Image Data

Figure 5:
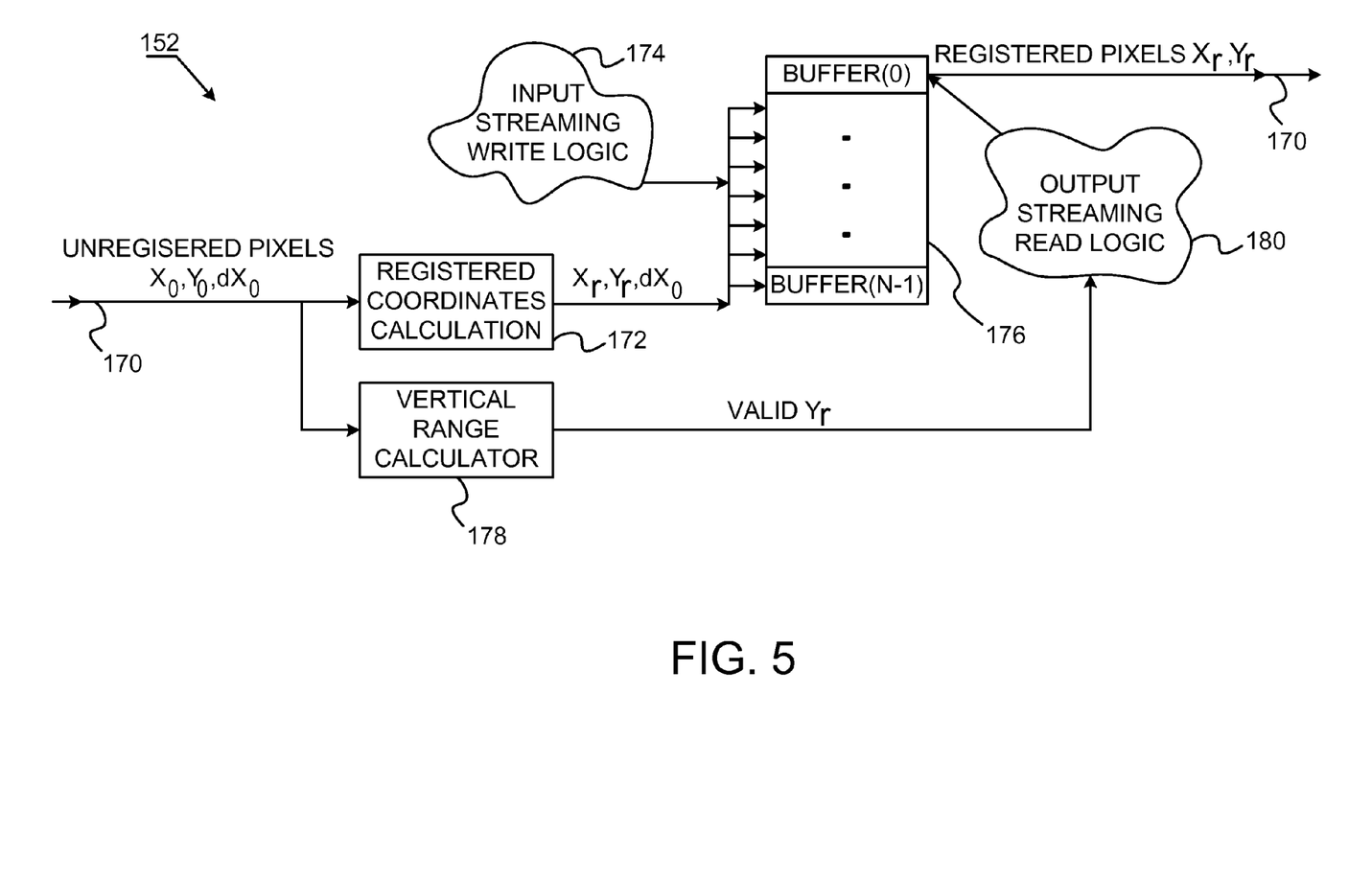
FIG. 5 is a block diagram that schematically shows details of a registration engine, in accordance with an embodiment of the present invention.

FIG. 5 is a block diagram that schematically shows details of registration engine 152, in accordance with an embodiment of the present invention. The registration engine is connected to receive depth pixel values via a pixel bus 170. The pixels have the form $(x_0, y_0, dX_0)$, wherein $X_0$ and $Y_0$ are the raw horizontal and vertical coordinates, before registration, and $dX_0$ is the pixel shift value measured by match engine 144 between this pixel and the corresponding pixel in the reference image. (Because illumination subassembly 30 and depth image capture subassembly 36 are arranged along the X axis, only X-direction shift is significant in triangulation of the depth.)

A registered coordinate calculation block 172 counts columns and lines of incoming pixels and uses a parabolic fitting process to calculate registered coordinates $(x_r, y_r)$ for each $dX_0$ pixel shift value. This calculation is described in detail hereinbelow. Input streaming write logic 174 writes the incoming pixel shift values into the appropriate registered locations in an N-line buffer 176, according to the registered coordinates. Logic 174 also manages buffer line allocation as the pixels advance.

A vertical range calculator 178 calculates the minimum registered line number ($Y_r$) that will no longer be affected by the current input line. This number indicates the next line that may be read out of buffer 176. Calculator 178 likewise uses a parabolic fitting equation for this calculation. Output streaming logic 180 uses the minimum registered line number value in choosing lines of registered pixel values to read out of buffer 176 to pixel bus 170. As a result of the registration process, this stream of pixel depth values is registered with the corresponding color values in block 72.

Operation of registered coordinate calculation block 172 will now be presented in detail. The calculation performed by block 172 uses the following parameters, some of which are shown in FIG. 2:

$D_{cl}$—distance between the optical axes of the illumination and depth image capture subassemblies 30 and 36.

dX—calculated pattern shift at a point between reference and current depth images.

$D_{srs}$—distance between depth image capture subassembly 36 and reference plane 54.

$D_{srr}$—distance between subassembly 36 and a registration reference plane.

d—depth value (which may be positive or negative) of a point on the object surface relative to reference plane 54.

$D_{cc}$—distance between the depth and color image capture subassemblies 38 and 44.

The depth d can be calculated from the shift dX as follows:

$$d = \frac{dX * D_{srs}}{D_{cl} - dX} \quad (1)$$

Due to geometrical factors, the depth d at a given point causes a shift $\Delta$ between the color and depth images at that point:

$$\Delta = \Delta_0 + \frac{D_{cc} * d}{D_{srr} + d} \quad (2)$$

In the above formula, $\Delta_0$ is an initial set of point-wise shifts between the color and depth images at a reference plane at the distance $D_{srr}$ from assembly 24, due to the offset and possibly misalignment between the cameras. The formula theoretically applies to both X and Y shifts, but in the configuration shown in FIG. 2, the Y shift is essentially constant throughout any given region of interest: $\Delta^y = \Delta_0^y$, and the above formula applies only to the X shift $\Delta^x$.

The registered coordinates for each input pattern shift value dX at point ($x_0$, $y_0$) in the unregistered image are then given by:

$$x_r = x_o + \Delta^x = x_o + \Delta_0^x + \frac{D_{cc} * d}{D_{srr} + d} \quad (3)$$
$$y_r = y_o + \Delta^y = y_o + \Delta_0^y$$

The initial set of point-wise shifts could be stored in a lookup table, but to reduce on-chip storage, block 172 may use a parabolic fitting calculation instead:

$$\Delta_0^x(x, y) = a_x x^2 + b_x y^2 + c_x xy + d_x x + e_x y + f_x$$
$$\Delta_0^y(x, y) = a_y x^2 + b_y y^2 + c_y xy + d_y x + e_y y + f_y \quad (4)$$

The twelve fitting coefficients in the above equation are calculated in advance, typically based on a calibration procedure, and are then loaded into the appropriate registers in processor 50. Alternatively, other types of fitting functions may be used.

Now combining the above formulas, and assuming $D_{srs} = D_{srr}$, the registered coordinates are given by:

$$x_r = x_0 + a_x x_0^2 + b_x y_0^2 + c_x x_0 y_0 + d_x x_0 + f_x + \beta dX_0$$
$$y_r = y_0 + a_y x_0 + b_y y_0 + c_y x_0 t_0 + d_y x_0 + e_y y_0 + f_y \quad (5)$$

wherein $$\beta = \frac{D_{cc}}{D_{cl}}.$$

To simplify the above calculation, the values of $\Delta_0^x$ and $\Delta_0^y$ in the formula may be calculated incrementally for each pixel, based on values calculated previously for neighboring pixels $$\Delta_0^x(x_0+1, y_0) = \Delta_0^x(x_0, y_0) + \Delta_x \Delta_0^x(x_0, y_0)_x$$
$$\Delta_0^y(x_0+1, y_0) = \Delta_0^y(x_0, y_0) + \Delta_y \Delta_0^y(x_0, y_0) \quad (6)$$
$$\Delta_0^x(x_0, y_0+1) = \Delta_0^x(x_0, y_0) + \Delta_x \Delta_0^x(x_0, y_0)$$
$$\Delta_0^y(x_0, y_0+1) = \Delta_0^y(x_0, y_0) + \Delta_y \Delta_0^y(x_0, y_0)$$

The values $\Delta_0^x(0,-1)$ and $\Delta_0^y(0,-1)$ at the upper left corner of the picture, are pre-calculated as the start point for the above incremental calculation.

Figures 6, 6A:
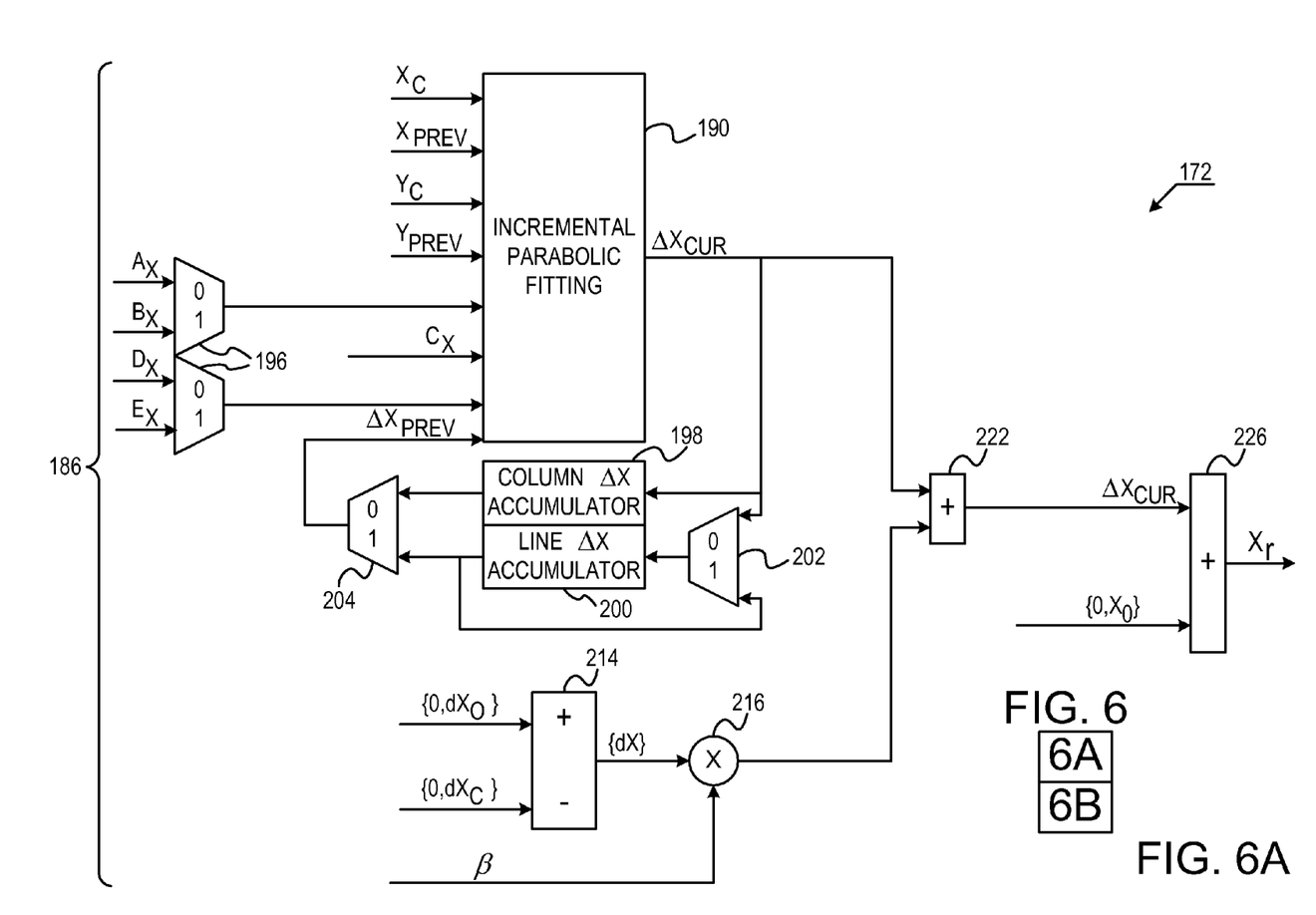
FIGS. 6A and 6B are block diagrams that schematically show details of a coordinate calculation circuit, in accordance with an embodiment of the present invention.
Figure 6B:
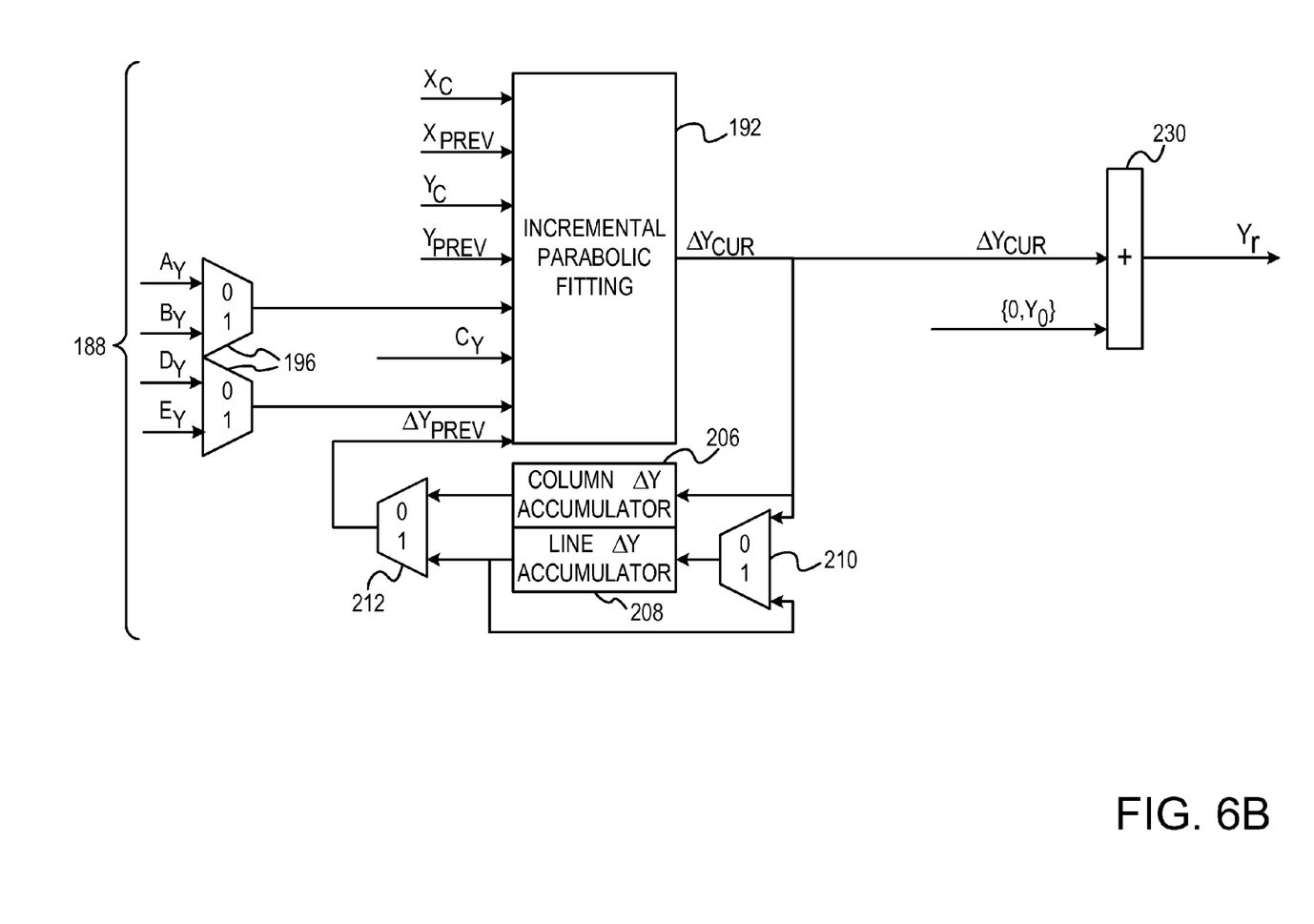

FIG. 6 (consisting of FIGS. 6A and 6B) is a block diagram that schematically shows details of registered coordinate calculation block 172, in accordance with an embodiment of the present invention. FIG. 6A shows an X-coordinate calculation sub-block 186, while FIG. 6B shows a Y-coordinate calculation sub-block 188. These sub-blocks implement the calculation outlined above in equations (5) and (6). More specific details of the digital logic design of these sub-blocks are presented in the above-mentioned provisional patent application, but some of these details are omitted here for the sake of simplicity.

Sub-blocks 186 and 188 are built around incremental parabolic fitting circuits 190 and 192, which perform the calculations of equation (6). For each successive pixel, circuits 190 and 192 receive as inputs the registered coordinate values calculated for the previous pixel ($x_{prev}$, $y_{prev}$), as well as the parabolic fitting parameters a, b, c, d, e for X and Y. (Capital and small letters are used interchangeably in the text and figures for convenience.) Multiplexers 196 select the "0" input during horizontal advance along each line of the image (incrementing X) and the "1" input during vertical advance from line to line (incrementing Y).

The output of circuits 190 and 192 are the $\Delta_0^x$ and $\Delta_0^y$ shift values for the current pixel. During horizontal advance, these values are stored in column shift accumulators 198 and 206, which then output the accumulated results for input as the previous X and Y shift values to the fitting calculation of circuits 190 and 192 for the next pixel. The shift values are also stored, via multiplexers 202 and 210, in line shift accumulators 200 and 208. During vertical advance, multiplexers 204 and 212 select the contents of accumulators 200 and 208 for input to circuits 190 and 192. As above, the multiplexers select the "0" input during horizontal advance and the "1" input during vertical advance.

For the X-direction, sub-block 186 receives the depth-related pattern shift values $dX_0$ and $dX_c$ from matching engine 144 and takes the difference between these values in a subtractor 214 to give the incremental shift for the current pixel dX. (When no input value is available for $dX_0$ or $dX_c$, the value 0 may be used instead.) A multiplier 216 multiplies this shift by the pre-calibrated parameter β. An adder 222 sums the result with the parabolic shift value calculated by circuit 190. The result, finally, is summed with the current X-coordinate $x_0$ by an adder 226 to give the registered coordinate $x_r$, as defined by equation (5). The registered Y-coordinate is similarly calculated by an adder 230, but without any depth-related pattern shift component, as explained above.

Returning now to FIG. 5, since the registration shift that is calculated for each pixel varies over the area of the image, the stream of registered coordinates generated in registration engine will generally be unsynchronized with the input pixel stream. Buffer 176 and read logic 180 compensate for the variable delay between input and output. The number of lines in buffer 176 is given by the value of $$\max_{\text{any } x_0, y_0} (\max \Delta^y - \min \Delta^y).$$

For any input line $y_0$, the greatest registered line $y_r$ in buffer 176 that can receive pixels from input line $y_0$ is $y_r = y_0 + \min \Delta^y(y_0)$. This value is calculated by vertical range calculator 178 and fed to logic 180. On this basis, logic 180 can read out from buffer 176 all lines above line $y_r$.

Depending on the values of the coefficients $f_x$ and $f_y$ in equation (5), there may be several columns and/or rows at the edges of the depth map produced by depth processor 62 that do not overlap with the color image produced by color processing block 72. As a result, read logic 180 may need to discard lines of depth values at the edge of the depth map that "spill over" the edge of the color image, and add one or more lines of null or dummy depth values to extend the depth map so that it covers the entire color image. Such dummy values may be created synthetically by post-processing block 154.

Lossless Compression of Depth and Color Images

Figure 7:
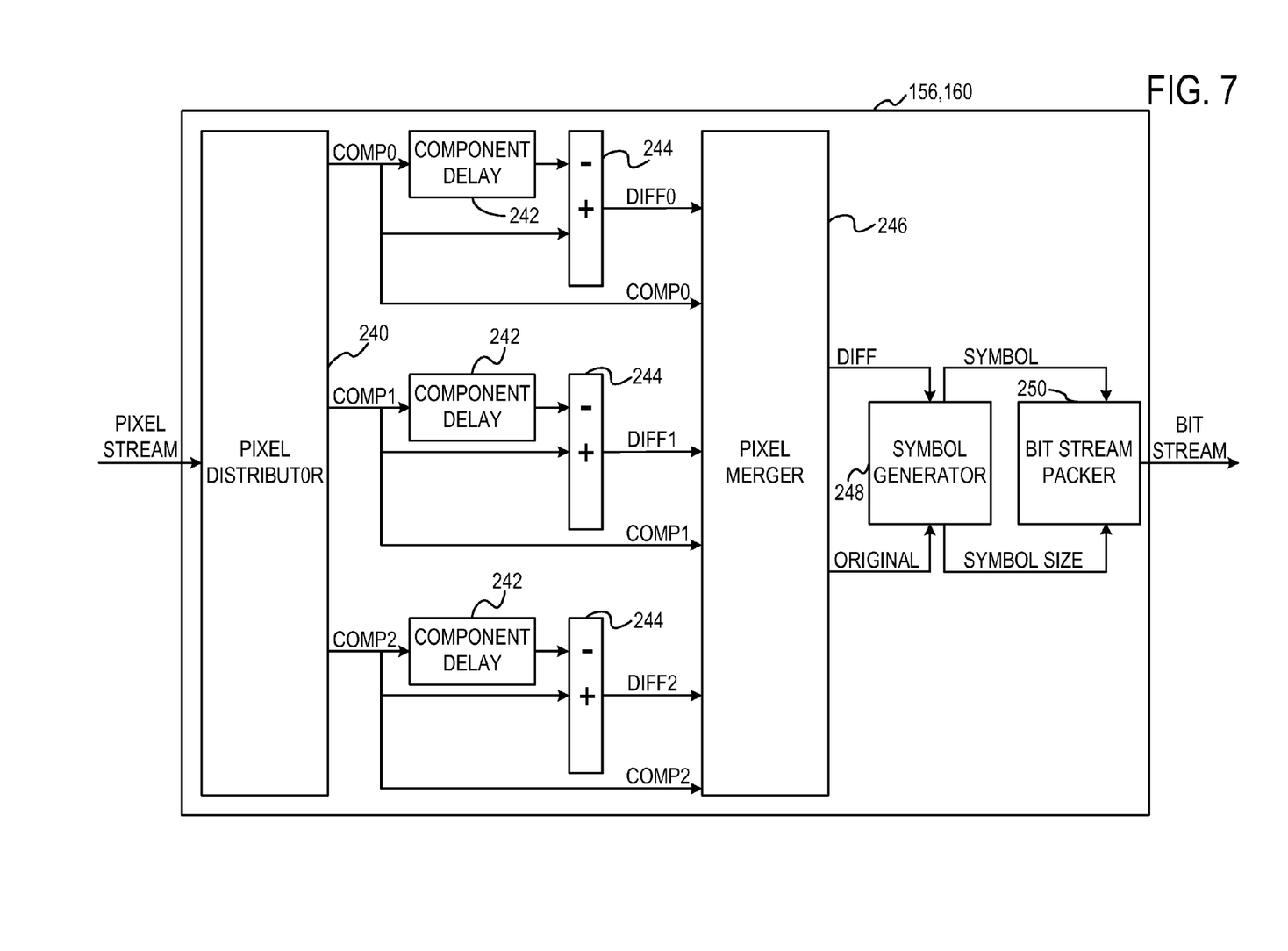
FIG. 7 is a block diagram that schematically illustrates a compression circuit, in accordance with an embodiment of the present invention.

FIG. 7 is a block diagram that schematically shows details of lossless compression blocks 156 and 160, in accordance with an embodiment of the present invention. The block design shown in the figure is capable of compressing from one to three image components simultaneously. For depth maps, only one component is typically used. For color images, two or three components may be used, depending on the type of color encoding. The compression block uses difference and run-length encoding to compress the input stream efficiently without data loss. This compression makes it possible to transmit both the depth and color image data (as well as audio data) over the limited bandwidth afforded by the single USB serial link to host computer 26. Alternatively, the compression blocks may be bypassed when sufficient output bandwidth is available.

A pixel distributor 240 divides the stream of input pixel values into components. For each component, a subtractor 244 calculates the difference between the current component value and the previous value, as provided by a component delay line 242. The difference values are input to a pixel merger circuit 246, which merges the differences back into a single difference stream. Circuit 246 also receives and merges the component values themselves, which are used instead of the difference values for the first pixel in each line and whenever the difference between successive pixels exceeds a certain threshold.

A symbol generator 248 encodes the difference and/or original pixel values. Typically, the symbol generator uses run-length encoding to represent the number of repetitions of the same value, and thus reduce the data volume still further. The symbol generator may also add synchronization signals on line and frame boundaries, to assist in subsequent decoding and reduce the impact of any possible data loss downstream. A bit stream packer 250 converts the encoded symbols into a continuous bit stream for USB transmission. The bit stream packer may add stuff bits so that the beginning of each new line and frame will be properly byte-aligned in a USB packet.

Although the embodiments above use specific device architectures, protocols, and configurations, the principles of the present invention may similarly be applied using architectures, protocols, and configurations of other types. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A device for processing data, comprising:
   a first input port for receiving color image data, comprising a first array of color image pixels, from a first image sensor;
   a second input port for receiving depth-related image data from a second image sensor;
   processing circuitry, for generating a depth map using the depth-related image data, the depth map comprising a second array of depth pixels with respective depth values, and after generating the depth values, registering the depth map with the color image data by computing different, respective shifts for the depth pixels responsively to the depth values, and applying the respective shifts to the depth pixels in the second array in order to register the depth pixels with respective, associated color image pixels in the first array; and
   at least one output port for conveying the registered depth map and the color image data to a host computer.

2. The device according to claim 1, wherein the first and second input ports, the processing circuitry and the at least one output port are integrated circuit components, which are fabricated on a single semiconductor substrate.

3. The device according to claim 1, wherein the at least one output port comprises a single port and is coupled to convey the depth map and the color image data to the host computer as a single data stream in a multiplexed format.

4. The device according to claim 3, wherein the processing circuitry is configured to synchronize the depth map with the color image data in the single data stream.

5. The device according to claim 3, and comprising a third input port for receiving audio information, wherein the processing circuitry is configured to incorporate the audio information together with the depth map and the color image data into the single data stream for conveyance to the host computer via the single port.

6. The device according to claim 3, wherein the single port comprises a Universal Serial Bus (USB) port.

7. The device according to claim 1, wherein the processing circuitry is configured to compute the respective shifts incrementally, such that the shifts of the pixels within a line of the depth map are computed as a function of a preceding pixel shift.

8. The device according to claim 7, wherein the processing circuitry is configured to compute the respective shifts using an incremental fitting process.

9. The device according to claim 1, wherein the processing circuitry is configured to compute the respective shifts for the pixels on the fly, while receiving the depth values, without storing the entire depth map in the device.

10. The device according to claim 1, wherein the processing circuitry is configured to compress the depth map and the color image data for transmission to the host via the at least one output port.

11. The device according to claim 10, wherein the processing circuitry is configured to apply a process of lossless compression to the depth map and the color image data.

12. The device according to claim 1, wherein the depth-related image data comprise an image of a pattern that is projected onto an object, and wherein the processing circuitry is configured to generate the depth map by measuring shifts in the pattern relative to a reference image.

13. Apparatus for imaging, comprising:
a first image sensor, which is configured to capture and output a color image of an object, comprising a first array of color image pixels;
a second image sensor, which is configured to capture and output depth-related image data with respect to the object; and
a processing device, which comprises:
a first input port for receiving the color image from the first image sensor;
a second input port for receiving the depth-related image data from the second image sensor;
processing circuitry, for generating a depth map using the depth-related image data, the depth map comprising a second array of depth pixels with respective depth values, and after generating the depth values, registering the depth map with the color image data by computing different, respective shifts for the depth pixels responsively to the depth values, and applying the respective shifts to the depth pixels in the second array in order to register the depth pixels with respective, associated color image pixels in the first array; and
at least one output port for conveying the registered depth map and the color image data to a host computer.

14. The apparatus according to claim 13, and comprising an audio sensor, wherein the processing device comprises a third input port for receiving audio information from the audio sensor, and wherein the processing circuitry is configured to convey the audio information together with the depth map and the color image data to the host computer via the at least one output port.

15. The apparatus according to claim 13, wherein the at least one output port comprises a single port and is coupled to convey the depth map and the color image data to the host computer as a single data stream in a multiplexed format.

16. The apparatus according to claim 13, and comprising an illumination subassembly, which is configured to project a pattern onto the object, wherein the depth-related image data comprise an image of the pattern on the object, and wherein the processing circuitry is configured to generate the depth map by measuring shifts in the pattern relative to a reference image.

17. A method for processing data, comprising:
receiving color image data, comprising a first array of color image pixels, from a first image sensor via a first input port;
receiving depth-related image data from a second image sensor via a second input port;
generating a depth map using the depth-related image data, the depth map comprising a second array of depth pixels with respective depth values;
after generating the depth values, registering the depth map with the color image data by computing different, respective shifts for the depth pixels responsively to the depth values, and applying the respective shifts to the depth pixels in the second array in order to register the depth pixels with respective, associated color image pixels in the first array; and
conveying the registered depth map and the color image data via an output port to a host computer.

18. The method according to claim 17, wherein the depth map is generated by processing circuitry, and wherein the first and second input ports, the processing circuitry and the at least one output port are integrated circuit components, which are fabricated on a single semiconductor substrate.

19. The method according to claim 17, wherein the at least one output port comprises a single port and is coupled to convey the depth map and the color image data to the host computer as a single data stream in a multiplexed format.

20. The method according to claim 19, wherein conveying the depth map comprises synchronizing the depth map with the color image data in the single data stream.

21. The method according to claim 19, and comprising receiving audio information, and incorporating the audio information together with the depth map and the color image data into the single data stream for conveyance to the host computer via the single port.

22. The method according to claim 19, wherein the single port comprises a Universal Serial Bus (USB) port.

23. The method according to claim 17, wherein computing the respective shifts comprises processing the respective shifts incrementally, such that the shifts of the pixels within a line of the depth map are computed as a function of a preceding pixel shift.

24. The method according to claim 23, wherein processing the respective shifts comprises computing the respective shifts using an incremental fitting process.

25. The method according to claim 17, wherein computing the respective shifts comprises calculating the respective shifts for the pixels on the fly, while receiving the depth values, without storing the entire depth map while calculating the respective shifts.

26. The method according to claim 17, wherein conveying the depth map and the color image data comprises compressing the depth map and the color image data for transmission to the host via the at least one output port.

27. The method according to claim 26, wherein compressing the depth map and the color image data comprises applying a process of lossless compression to the depth map and the color image data.

28. The method according to claim 17, wherein the depth-related image data comprise an image of a pattern that is projected onto an object, and wherein generating the depth map comprises measuring shifts in the pattern relative to a reference image.

* * * * *